(12) United States Patent
Inoue et al.

(10) Patent No.: US 9,513,526 B2
(45) Date of Patent: *Dec. 6, 2016

(54) FINE ELECTRET PARTICLES AND PROCESS FOR PRODUCING SAME

(75) Inventors: Hiroshi Inoue, Osaka (JP); Tomochika Yoshitsugi, Osaka (JP); Ryuichi Kiyoe, Osaka (JP)

(73) Assignee: SAKURA COLOR PRODUCTS CORPORATION, Osaka-shi (JP)

( * ) Notice: Subject to any disclaimer, the term of this patent is extended or adjusted under 35 U.S.C. 154(b) by 285 days.

This patent is subject to a terminal disclaimer.

(21) Appl. No.: 14/116,192

(22) PCT Filed: May 2, 2012

(86) PCT No.: PCT/JP2012/061583
§ 371 (c)(1),
(2), (4) Date: Feb. 5, 2014

(87) PCT Pub. No.: WO2012/157452
PCT Pub. Date: Nov. 22, 2012

(65) Prior Publication Data
US 2014/0147777 A1 May 29, 2014

(30) Foreign Application Priority Data

May 13, 2011 (JP) .................................. 2011-108727
Nov. 11, 2011 (JP) .................................. 2011-248088

(51) Int. Cl.
*G02F 1/167* (2006.01)
*H01G 7/02* (2006.01)

(52) U.S. Cl.
CPC .............. *G02F 1/167* (2013.01); *H01G 7/023* (2013.01); *G02F 2001/1678* (2013.01)

(58) Field of Classification Search
CPC ...... A61K 2800/412; B82Y 30/00; B82Y 10/00; B82Y 20/00; H01G 7/02; C09D 11/322; C09D 7/1275; C09D 7/1283; C09D 7/1291
USPC ........ 428/402–402.24, 403, 404, 407, 321.1, 428/474.4; 430/32, 137.1, 109.1, 109.4, 430/110.2, 111.4, 122.51; 427/331, 389.9, 427/212, 213–213.36, 483, 256; 424/400, 424/408, 450, 451, 455, 93.7, 184.1, 497, 424/489, 501, 490, 491, 492, 493, 494, 495

See application file for complete search history.

(56) References Cited

U.S. PATENT DOCUMENTS

2003/0164480 A1    9/2003   Wu et al.
2003/0169227 A1    9/2003   Wu et al.

(Continued)

FOREIGN PATENT DOCUMENTS

| CN | 1430093 A | 7/2003 |
|---|---|---|
| CN | 1484083 A | 3/2004 |
| JP | 2004-085635 A | 3/2004 |

(Continued)

OTHER PUBLICATIONS

International Search Report dated May 29, 2012, issued in corresponding application No. PCT/JP2012/061583.

*Primary Examiner* — James J Seidleck
*Assistant Examiner* — S. Camilla Pourbohloul
(74) *Attorney, Agent, or Firm* — Westerman, Hattori, Daniels & Adrian, LLP

(57) ABSTRACT

The present invention provides uniformly electrified electret fine particles having excellent electrophoretic properties. Specifically, the present invention provides a core-shell electret fine particle comprising a core part and a shell part, the core part containing a material that has an ability to disperse a pigment therein, the shell part containing an electret resin, and the electret resin being a fluorine-containing resin and being electretized by electron ray irradiation, radial ray irradiation, or corona discharge treatment.

16 Claims, 2 Drawing Sheets

(56) References Cited

U.S. PATENT DOCUMENTS

| | | |
|---|---|---|
| 2004/0169633 A1 | 9/2004 | Chen et al. |
| 2004/0227985 A1* | 11/2004 | Kishi ............... G02F 1/167 359/296 |
| 2006/0132896 A1* | 6/2006 | Hsu ............... C09B 67/0004 359/296 |

FOREIGN PATENT DOCUMENTS

| | | |
|---|---|---|
| JP | 2005-031189 A | 2/2005 |
| JP | 2006-113390 A | 4/2006 |
| JP | 2007-206570 A | 8/2007 |
| JP | 2007-249080 A | 9/2007 |
| JP | 4903907 B1 | 3/2012 |

* cited by examiner (a)

(b)

FINE ELECTRET PARTICLES AND PROCESS FOR PRODUCING SAME

TECHNICAL FIELD

The present invention relates to electret fine particles useful as electrophoretic particles used for a full-color electrophoretic display device (i.e., electronic paper). The present invention also relates to a process for producing the electret fine particles.

BACKGROUND ART

In recent years, electrophoretic display methods, which employ the electrophoresis of charged fine particles (electret fine particles), have been attracting attention as the most promising technology for next-generation display devices. However, this technology has many problems, including the shape of the charged fine particles, small and unstable charge potential (ζ potential), secondary aggregation or sedimentation of electrophoretic particles, inadequate deletion of previously displayed images, unsatisfactory response speed, and the like. Therefore, research and development has been conducted to correct such shortcomings.

Patent Literature 1 and 2 disclose electret particles for the above application.

Patent Literature 1 discloses negatively charged fine particles produced through addition of a resin serving as an electron trap to superfine spherical core resin particles having a particle diameter of 1-10 μm obtained by polymerization of a polymeric fine particle material and through irradiation of the particles with a 10-300 kGy electron beam to form negatively charged electret fine particles, wherein the core resin is colored with a desired color (Claim 1).

Patent Literature 2 discloses colored and negatively charged microparticulates obtained by adding an electron trap material, a pigment, etc., to a polymeric fine particle monomer material; producing spherical fine particles having a particle diameter of 5-10 μm through suspension polymerization, emulsion polymerization, dispersion polymerization, or the like; and forming negatively charged electret microparticulates either by irradiating the particles with a 10-50 kGy electron beam and heating the particles for ten and several minutes at 90 to 110° C., or irradiating the particles with a 10-50 kGy electron beam at 90 to 110° C., wherein the negatively charged electret microparticulates are colored with a desired color and have a ζ potential of −50 to −100 mV (Claim 10).

However, the various hitherto-known electret particles are often unevenly electrified, and thereby have a problem of insufficient electrophoretic properties. Therefore, development of electret particles that can be uniformly electrified and have excellent electrophoretic properties has been desired.

CITATION LIST

Patent Literature

PTL 1: JP2005-31189A
PTL 2: JP2007-206570A

SUMMARY OF INVENTION

Technical Problem

An object of the present invention is to provide uniformly electrified electret fine particles having excellent electrophoretic properties, and a process for producing the electret fine particles.

Solution to Problem

In order to achieve the above object, the present inventors conducted extensive research and found that the object can be achieved by an electret fine particle obtained by electretizing a specific core-shell structure, i.e., obtained by processing a specific core-shell structure into an electret core-shell structure. With this finding, the inventors completed the present invention.

Specifically, the present invention relates to the following electret fine particles and processes for producing the electret fine particles.

1. A core-shell electret fine particle comprising a core part and a shell part,
the core part containing a material that has an ability to disperse a pigment therein, the shell part containing an electret resin, and the electret resin being a fluorine-containing resin and being electretized by electron ray irradiation, radial ray irradiation, or corona discharge treatment.

2. The electret fine particle according to Item 1, wherein the electret resin is a fluorine-containing resin having a percent fluorine substitution of 10% or more.

3. The electret fine particle according to Item 1 or 2, wherein the electret resin is a vinylidenefluoride-hexafluoropropylene-tetrafluoroethylene terpolymer.

4. The electret fine particle according to any one of Items 1 to 3, wherein the material that has an ability to disperse a pigment therein is a resin.

5. The electret fine particle according to any one of Items 1 to 4, wherein the electret fine particle has a mean particle diameter of 1000 μm or less.

6. The core-shell electret fine particle comprising a core part and a shell part according to Item 1,
wherein the core part contains a resin that has an ability to disperse a pigment therein and a pigment having a mean particle diameter of 0.02 to 0.2 μm, and the shell part contains an electret resin, the electret resin being a vinylidenefluoride-hexafluoropropylene-tetrafluoroethylene terpolymer and being electretized by electron ray irradiation, radial ray irradiation, or corona discharge treatment, and
wherein the electret fine particle has a mean particle diameter of 1000 μm or less.

7. A process for producing core-shell electret fine particles, comprising:
forming core-shell structures each comprising a core part containing a material that has an ability to disperse a pigment therein, and a shell part containing a fluorine-containing resin as a resin for electretization; and
subjecting the core-shell structures to electron ray irradiation, radial ray irradiation, or corona discharge treatment.

8. The production process according to Item 7, wherein the core-shell structures are dispersed in an electrophoretic medium to be subjected to electron ray irradiation, radial ray irradiation, or corona discharge treatment.

Hereinafter, the electret fine particles of the present invention and the process for producing the electret fine particles are described.

The electret fine particle of the present invention is a core-shell electret fine particle having a core part and a shell part. The core part contains a material that has an ability to disperse a pigment therein, and the shell part contains an electret resin. The electret resin is a fluorine-containing resin and is electretized by electron ray irradiation, radial ray irradiation, or corona discharge treatment.

The electret fine particle of the present invention having the above-described features comprises a core part that allows a pigment to be dispersed therein, and is therefore useful as an electrophoretic particle used for a full-color electrophoretic display device. Further, the electret fine particle of the present invention comprises a shell part that contains as an electret resin a fluorine-containing resin and that is electretized by electron ray irradiation, radial ray irradiation, or corona discharge treatment. The electret fine particle of the present invention is therefore uniformly electrified and exhibits excellent electrophoretic properties.

The core part contains a material that has an ability to disperse a pigment therein. The material that has an ability to disperse a pigment therein is not limited; however, a fluorine-containing compound is preferable, because electret properties can be imparted, together with the shell part, to the core part having a pigment dispersed therein. Examples of fluorine-containing compounds include various known fluorine-containing resins, fluorine-containing oils, fluorine-containing adhesives, and the like.

Examples of the fluorine-containing resins include tetrafluoroethylene resins, straight-chain fluoropolyether compounds, tetrafluoroethylene-vinyl monomer copolymers, polymerizable amorphous fluorocarbon resins, and the like.

Specific examples of tetrafluoroethylene resins include polymers of polytetrafluoroethylene (PTFE) or derivatives thereof represented by $FR_1C=CR_1R_2$, wherein $R_1=F$ or $H$ and $R_2=F$ or $H$ or $Cl$ or any other element, and the like.

Specific examples of straight-chain fluoropolyether compounds include SIFEL3590-N, SIFEL2610, and SIFEL8470 (product names, all produced by Shin-Etsu Chemical Co., Ltd.).

Specific examples of tetrafluoroethylene-vinyl monomer copolymers include Zeffle (product name, produced by Daikin Industries, Ltd.).

Specific examples of polymerizable amorphous fluorocarbon resins include CYTOP (product name, produced by Asahi Glass Co., Ltd.).

Examples of the fluorine-containing oils include perfluoropolyether oil, chlorotrifluoroethylene oligomer, and the like. Specific examples include perfluoropolyether oil (DEMNUM, product name, produced by Daikin Industries, Ltd.), chlorotrifluoroethylene oligomer (DAIFLOIL, product name, produced by Daikin Industries, Ltd.), and the like.

Examples of the fluorine-containing adhesives include ultraviolet-curable fluorinated epoxy adhesives and the like, such as OPTODYNE (product name, produced by Daikin Industries, Ltd.).

Among the materials listed above, resins are preferably used as the material that has an ability to disperse a pigment therein.

Known resins, in addition to fluorine-containing resins, may also be used as the material that has an ability to disperse a pigment therein. Examples of known resins include acrylic resins, polystyrene resins, polyester resins, polyurethane resins, polyolefin resins (e.g., polyethylene, polypropylene), chlorinated polyolefin resin, vinyl chloride-vinyl acetate copolymer resins, polyvinyl butyral resins, alkyd resins, petroleum resins, ketone resins, epoxy resins, melamine resins, silicone resins, cellulose derivatives, rubber resins, and the like. Of these, acrylic resins, polystyrene resins, polyurethane resins, etc., are preferable. Commercially available products that have preliminarily been made into resin beads (colored or non-colored) may also be used as these resins. Examples of acrylic resin beads include TAFTIC series (product name, produced by Toyobo Co., Ltd.), Art Pearl GR series (product name, produced by Negami Chemical Industrial Co., Ltd.), Chemisnow MX series (product name, produced by Soken Chemical & Engineering Co., Ltd.), Rubcouleur series (product name, produced by Dainichiseika Color & Chemicals Mfg. Co., Ltd.), Techpolymer MB series (product name, produced by Sekisui Chemical Co., Ltd.), and the like. Examples of polystyrene resin beads include Techpolymer SBX series (product name, produced by Sekisui Chemical Co., Ltd.), Chemisnow SX series (product name, produced by Soken Chemical & Engineering Co., Ltd.), and the like. Examples of polyurethane resin beads include Art Pearl C series (product name, produced by Negami Chemical Industrial Co., Ltd.), and the like.

The pigment to be dispersed in the core part is not limited, and known pigments can be used. Dispersion of a pigment in the core part enables production of colored electret fine particles, which are useful as a material for full-color electronic paper.

Examples of inorganic pigments include, but are not limited to, black pigments containing carbon as a main component, such as carbon black, lamp black, bone black, and botanical black; and white pigments, such as titanium oxide, zinc oxide, calcium carbonate, barium sulfate, and silicon oxide. White pigments are useful for production of white electrophoretic particles or for the adjustment of the specific gravity of the particles.

Examples of organic pigments include, but are not limited to, azo pigments such as β-naphthol-based pigments, naphthol AS-based pigments, acetoacetic acid-based pigments, aryl amide-based pigments, pyrazolone-based pigments, acetoacetic acid arylamide-based pigments, pyrazolone-based pigments, β-naphthol-based pigments, β-oxynaphthoic acid-based pigments (BON acid-based azo pigments), naphthol AS-based pigments, or acetoacetic acid allylide-based pigments; and polycyclic pigments, such as phthalocyanine-based pigments, anthraquinone-based (threne) pigments, perylene-based pigments, perinone-based pigments, indigo-based pigments, thioindigo-based pigments, quinacridone-based pigments, dioxazine-based pigments, isoindolinone-based pigments, quinophthalone-based pigments, metal complex pigments, methine-based pigments, azo methine-based pigments, diketopyrrolopyrrole-based pigments, and the like. In addition, azine pigments, daylight fluorescent pigments (resin dye solid solution), hollow resin pigments, nitroso pigments, nitro pigments, natural pigments, and the like, may also be used.

Specific examples of commercially available products include Symuler Fast Yellow 4GO, Fastogen Super Magenta RG, Fastogen Blue TGR (DIC Corporation), Fuji Fast Red 7R3300E, Fuji Fast Carmine 527 (Fuji Shikiso K.K.), and the like.

The mean particle diameter of the pigments is preferably 20 μm or less, more preferably 3 μm or less. In particular, by setting the mean particle diameter of the pigments to be within a range of 0.02 to 0.2 μm, the resulting electret fine particles can be easily colored with a see-through color. The lower limit of the mean particle diameter may be set to about 0.02 μm. The mean particle diameter may be smaller depending on the type of pigments. The mean particle diameters of pigments in this specification are found by diluting a dispersion of the target object with an appropriate sufficiently compatible dispersion medium, and measuring the median diameter using a dynamic light scattering particle size distribution measurement device (LB-550, produced by HORIBA).

The core part may consist of two components, i.e., the material that has an ability to disperse a pigment therein, and a pigment. It is also possible that the core part additionally comprises known additives, such as a dispersing agent and a stabilizer, if necessary. The core part comprises a pigment preferably in an amount of about 1 to 30 wt %, and more preferably about 5 to 20 wt %, although the amount is not limited thereto.

The core part may be formed of either a single spherical particle or an agglomeration of a plurality of spherical particles. Specifically, in one embodiment of the electret fine particle of the present invention, the surface of the core part formed of a single spherical particle is covered with the shell part. In another embodiment of the invention, the circumference of the core part formed of an aggregate of a plurality of spherical particles is covered with the shell part. The particles forming the core part may also have a non-spherical shape such as polygon, in addition to a spherical shape.

The shell part contains a fluorine-containing resin as an electret resin. In the present invention, the electret resin in the shell part is subjected to electron ray irradiation, radial ray irradiation, or corona discharge treatment mentioned below, so as to be electretized. It is thereby possible to obtain uniformly electrified electret fine particles having excellent electrophoretic properties.

A fluorine-containing resin is used as the electret resin to achieve uniform and satisfactory electrification by electretizing the resin by electron ray irradiation, radial ray irradiation, or corona discharge treatment.

Examples of fluorine-containing resins include polytetrafluoroethylene (PTFE), polychlorotrifluoroethylene (PCTFE), polyvinylidene fluoride (PVDF), polyvinyl fluoride (PVF), perfluoropolyether (PFPE), and the like. These can be used singly, or in a combination of two or more. Copolymers thereof can also be used.

The PTFE mentioned above is represented by the following structural formula:

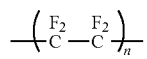

[Chem. 1]

Here, the percent fluorine substitution of PTFE based on the hydrocarbon structure before fluorine substitution, i.e., $-(CH_2-CH_2)_n-$, is 100%. As used herein, the "percent fluorine substitution" refers to the ratio of the number of fluorine substitutions to the number of hydrogens bonded to the carbons in the structure before fluorine substitution: $-(CH_2-CH_2)_n-$, $-(CH_2-CH_2-CH_2-O)_n-$, or $-(CH_2-CH(CH_3))_n-$. The percent fluorine substitution is calculated using the following formula:

Percent fluorine substitution (%)={(the number of fluorines substituted for hydrogens)/(the number of hydrogens bonded to the carbon atoms in the structure of hydrocarbon before fluorine substitution)}×100

Examples of PTFE include Polyflon PTFE (product name, produced by Daikin Industries, Ltd.), Teflon (registered trademark) PTFE (product name, produced by Du Pont-Mitsui Fluorochemicals Company, Ltd.), and the like.

The PCTFE mentioned above is represented by the following structural formula:

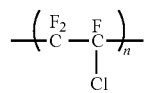

[Chem. 2]

The percent fluorine substitution of PCTFE calculated by using the above formula is 75%.

Examples of PCTFE include Neoflon PCTFE (product name, produced by Daikin Industries, Ltd.), and the like.

The PVDF mentioned above is represented by the following structural formula:

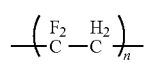

[Chem. 3]

The percent fluorine substitution of PVDF calculated by using the above formula is 50%.

Examples of PVDF include KF polymer (product name, produced by Kureha Corporation), Neoflon PVDF (product name, produced by Daikin Industries, Ltd.), and the like.

The PVF mentioned above is represented by the following structural formula:

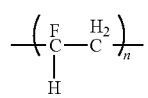

[Chem. 4]

The percent fluorine substitution of PVF calculated by using the above formula is 25%.

Examples of PVF include Tedlar (product name, produced by Solvay Solexis Inc.).

The PFPE mentioned above is represented by the following structural formula:

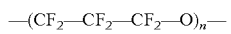

—(CF$_2$—CF$_2$—CF$_2$—O)$_n$— [Chem. 5]

The percent fluorine substitution of PFPE calculated by using the above formula is 100%.

Examples of PFPE include DEMNUM (product name, produced by Daikin Industries, Ltd.), and the like.

Examples of copolymers containing, as a copolymer component, any one of the fluorine-containing resins described above include tetrafluoroethylene-perfluoroalkoxyvinylether copolymer (PFA), tetrafluoroethylene-hexafluoropropylene copolymer (FEP), tetrafluoroethylene-ethylene copolymer (ETFE), chlorotrifluoroethylene-ethylene copolymer (ECTFE), vinylidene fluoride-tetrafluoroethylene copolymer, vinylidenefluoride-hexafluoropropylene-tetrafluoroethylene terpolymer, and the like. Of these copolymers, vinylidenefluoride-hexafluoropropylene-tetrafluoroethylene terpolymer is particularly preferable, because uniform and satisfactory electrification can be achieved.

The PFA mentioned above is represented by the following structural formula:

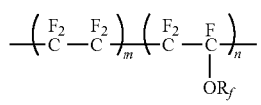

[Chem. 6]

In the formula, $R_f$ is alkyl, and m and n represent the copolymerization rates of the respective units.

The tetrafluoroethylene unit has a percent fluorine substitution of 100%, while the perfluoroalkoxyvinylether unit has a percent fluorine substitution of 75%. Therefore, the percent fluorine substitution of PFA changes depending on the copolymerization rates m and n.

Examples of PFA include Teflon (registered trademark) PFA (product name, produced by Du Pont-Mitsui Fluorochemicals Company, Ltd.), Neoflon PFA (product name, produced by Daikin Industries, Ltd.), Fluon PFA (product name, produced by Asahi Glass Co., Ltd.), and the like.

The FEP mentioned above is represented by the following structural formula:

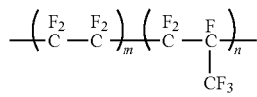

[Chem. 7]

In the formula, m and n represent the copolymerization rates of the respective units.

The tetrafluoroethylene unit has a percent fluorine substitution of 100%, while the hexafluoropropylene unit has a percent fluorine substitution of 100%. The percent fluorine substitution of FEP is therefore 100%.

Examples of FEP include Neoflon FEP (product name, produced by Daikin Industries, Ltd.), Teflon (registered trademark) FEP (product name, produced by Du Pont-Mitsui Fluorochemicals Company, Ltd.), Dyneon FEP (product name, produced by Sumitomo 3M Limited), and the like.

The ETFE mentioned above is represented by the following structural formula:

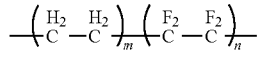

[Chem. 8]

In the formula, m and n represent the copolymerization rates of the respective units.

The tetrafluoroethylene unit has a percent fluorine substitution of 100%, while the ethylene unit has a percent fluorine substitution of 0%. The percent fluorine substitution of ETFE thus changes depending on the copolymerization rates m and n.

Examples of ETFE include Fluon ETFE (product name, produced by Asahi Glass Co., Ltd.), Neoflon ETFE (product name, produced by Daikin Industries, Ltd.), Dyneon ETFE (product name, produced by Sumitomo 3M Limited), and the like.

The ECTFE mentioned above is represented by the following structural formula:

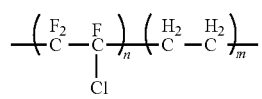

[Chem. 9]

In the formula, m and n represent the copolymerization rates of the respective units.

The chlorotrifluoroethylene unit has a percent fluorine substitution of 75%, while the ethylene unit has a percent fluorine substitution of 0%. The percent fluorine substitution of ECTFE therefore changes depending on the copolymerization rates m and n.

Examples of ECTFE include Halar (product name, produced by Solvay Solexis Inc.).

A vinylidene fluoride-tetrafluoroethylene copolymer is obtained by copolymerization of the vinylidene fluoride unit (percent fluorine substitution: 50%) and the tetrafluoroethylene unit (percent fluorine substitution: 100%). The percent fluorine substitution of the vinylidene fluoride-tetrafluoroethylene copolymer changes depending on the copolymerization rates.

A vinylidenefluoride-hexafluoropropylene-tetrafluoroethylene terpolymer is obtained by copolymerization of the vinylidene fluoride unit (percent fluorine substitution: 50%), the hexafluoropropylene unit (percent fluorine substitution: 100%), and the tetrafluoroethylene unit (percent fluorine substitution: 100%). The percent fluorine substitution of the terpolymer changes depending on the copolymerization rates.

Examples of vinylidenefluoride-hexafluoropropylene-tetrafluoroethylene terpolymers include VT470 (product name, produced by Daikin Industries, Ltd.).

In the present invention, the fluorine-containing resins (including copolymers) listed above each have a percent fluorine substitution of preferably 10% or more, more preferably 20% or more, and most preferably 25 to 100%.

The shell part may consist only of an electret resin. It is also possible that the shell part additionally comprises known additives, such as a dispersing agent, a pigment derivative, and a stabilizer, if necessary. The thickness of the shell part is not limited; it is preferably uniform so that the shell part is uniformly electrified. The electret fine particle comprising a combination of a core part and a shell part preferably has a mean particle diameter of 1000 μm or less. In particular, the mean particle diameter is preferably 0.02 to 1000 μm. The weight ratio of the core part to the shell part is not limited; the weight ratio of the core part:shell part is preferably 50:50 to 90:10, and more preferably 70:30 to 80:20.

The electret fine particles of the present invention are electretized by electron ray irradiation, radial ray irradiation, or corona discharge treatment. Electretization by means of electron ray irradiation, radial ray irradiation, or corona discharge treatment makes the fluorine-containing resin contained as the electret resin serve as a trap. For this reason, it is possible to obtain electret fine particles semipermanently charged negatively. The conditions for electretization are described below in the section of production process.

Electret Fine Particle Production Process

The process for producing the electret fine particles described above is not limited. In the present invention, core-shell structures each comprising a core part containing a material that has an ability to disperse a pigment therein, and a shell part containing a fluorine-containing resin as a resin for electretization are formed. The formed core-shell structures are then subjected to electron ray irradiation, radial ray irradiation, or corona discharge treatment. Thereby, electret fine particles can be suitably produced. This production process (referred to as "production process of the present invention") is described below.

In the production process of the present invention, the core part and the shell part are as described above. The method for forming the core-shell structures is not limited. For example, known core-shell polymerization may be used to form the core-shell structures.

One example of the procedure for forming the core-shell structures using core-shell polymerization is described below:
(1) step 1: stirring a material that has an ability to disperse a pigment therein with a pigment to prepare a pigment dispersion;
(2) step 2: adding an electret resin to the pigment dispersion, and stirring the resulting liquid mixture;
(3) step 3: adding a curing agent or a polymerization initiator to the liquid mixture, and stirring the resulting solution;
(4) step 4: adding the solution obtained in (3) to an aqueous phase containing a stirred emulsifier, and stirring the resulting mixture to form core-shell structures.

In the formation of core-shell structures described above, stirring may be performed by using a known mixing device, such as a mixer, a homogenizer, and a dissolver. In the procedure above, the reaction is controlled so that curing and polymerization of the core-shell structures are initiated by performing heating and stirring in step 4, and not initiated in the preceding steps. Further, pulverization of the pigments into fine particles may be performed using a ball mill or bead mill. The stirring conditions are preferably adjusted so that the resulting electret fine particles have a mean particle diameter of 1000 μm or less.

Examples of the emulsifiers include, but are not limited to, polyvinyl alcohol, ethylene maleic anhydride, and the like.

Additionally, the electret fine particles may also be produced by using colored or color-free resin beads (e.g., acrylic resin beads, polystyrene resin beads, polyurethane resin beads) as the core part, and covering the surface of each resin bead with a shell part containing a fluorine-containing resin.

The obtained core-shell structures can be electretized, in the form of a suspension as is, or once the core-shell structures have been separated as powder or the powder has been dispersed in an electrophoretic medium, by subjecting them to electron ray irradiation, radial ray irradiation, or corona discharge treatment. The conditions for electron or radial ray irradiation and corona discharge treatment are not limited, insofar as the core-shell structure is electretized. For example, the irradiation may be conducted by emitting an electron ray of about 10 to 50 kGy using an electron beam accelerator. Radial ray irradiation may be performed, for example, by emitting a gamma ray of approximately 1 to 15 kGy.

The electrophoretic medium used herein is not limited, and examples thereof include air and liquid media. Examples of liquid media include ethylene glycol (EG), propylene glycol (PG), glycerin, silicone oils, fluorine-containing oils, petroleum oils, and the like. Examples of the silicone oils include dimethyl silicone oil and the like. Examples of the fluorine-containing oils include perfluoropolyether oil and the like.

In this manner, in a suitable embodiment, highly uniform electret fine particles of 1000 μm or less can be efficiently obtained. In the production process of the present invention, electret fine particles that have a highly uniform particle diameter and that are almost entirely charged (negatively charged) to a certain level or more can be easily produced at a high yield.

It is also possible to produce electret fine particles in which the core part and shell part are replaced with each other, insofar as the electret fine particles having excellent electrophoretic properties can be obtained. Specifically, it is possible to produce electret fine particles each comprising a core part containing an electret resin, and a shell part containing a material that has an ability to disperse a pigment therein and a pigment.

The electret fine particles undergo electrophoresis by being placed between electrode plates and having an external voltage applied between the electrode plates. The electrophoretic medium used herein is not limited, and air, liquid media, and the like can be used. Examples of liquid media include ethylene glycol (EG), propylene glycol (PG), glycerin, silicone oils, fluorine-containing oils, petroleum oils, and the like. Examples of silicone oils include dimethyl silicone oil. Examples of fluorine-containing oils include, in particular, perfluoropolyether oil. Silicone oils are particularly preferred among these media.

Electrophoretic Display Device

The electret fine particles are colored (preferably with a see-through color) with a pigment. The colored electret fine particles may be used as charged particles for an electrophoretic color display device. For example, a suitable electrophoretic color display device to which the electret fine particles are applied as charged particles comprises: a plurality of display units for individually displaying pixels; first electrodes; and second electrodes; the display units being arranged in a matrix form and each having cells with at least three layers, the cells containing charged particles; each of the first electrodes being provided on the upper or lower surface of each cell; each of the second electrodes being provided on the side edge of each cell; and the charged particles having different colors for every cell in each display unit.

In the electrophoretic display device above, each pixel has a display unit containing cells with at least three layers. Since each of the cells contains charged particles of different colors, a single pixel can display various colors by having a voltage applied across the first and second electrodes. Thus, no unused pixels are present in the image range during color image display. In the present invention, the colors for the three or more cells (a different color for each cell) are not limited; red (R), green (G), and blue (B), are preferable to make a full color display possible by the additive color mixture without using a color filter. In the present invention, the "side edge of the cell" refers to the upper peripheral edge, lower peripheral edge, and side of the cell.

The present invention is specifically described below with reference to example drawings.

As shown in FIG. 1, an electrophoretic display device 1 comprises a plurality of display units 2. Each display unit 2 has first to third cells 5a to 5c, and each of the cells is provided with a first electrode 3 and a second electrode 4 therein.

Each of the pixels for forming an image is provided with a display unit 2 having first to third cells 5a to 5c that are laminated in the height direction, as shown in FIG. 1. The first to third cells 5a to 5c are made of a transparent material such as glass or polyethylene terephthalate so that light can pass through. The bottom of each cell is provided with a base 7 for supporting the first electrode 3 and the second electrode 4. A reflector for reflecting light passing through the display unit 2, or a white board or black board that serves as the background color of an image, may be provided below the third cell 5c. Further, a shielding means may be provided on the upper peripheral edge of the first cell 5a so as to shield first to third charged particles 6a to 6c (described below) when the first to third charged particles 6a to 6c are accumulated on the second electrode 4.

Each of the first to third cells 5a to 5c is therein provided with, as shown in FIG. 1, the first electrode 3 and the second electrode 4 for collecting the first to third charged particles 6a to 6c (described below). The second electrode 4 is provided over the entire circumference of the inner side of each of the first to third cells 5a to 5c. The first electrode 3 is located on the bottom of each of the first to third cells 5a to 5c on the inner side of the second electrode 4 so that short circuiting between the first electrode 3 and the second electrode 4 is prevented. The first electrode 3 can have various forms, such as a plate, stripes, a lattice, or dots. The material of the first electrode 3 and the second electrode 4 is not limited. For example, a highly conductive metal, such as copper or silver, a transparent conductive resin, an ITO (indium tin oxide) film, or the like can be used.

Moreover, as shown in FIG. 1, the first cell 5a contains the first charged particles 6a, which are colored red (R), the second cell 5b contains the second charged particles 6b, which are colored green (G), and the third cell 5c contains the third charged particles 6c, which are colored blue (B). Further, each of the first to third cells 5a to 5c is filled with an electrophoretic medium for electrophoresing the first to third charged particles 6a to 6c.

Next, the operation of the above-mentioned electrophoretic display device 1 is described with reference to FIGS. 2 and 3. In FIG. 2, first to third cells 5a to 5c are collectively referred to as "cell 5," and first to third charged particles are collectively referred to as "charged particles 6."

When the electrophoretic display device 1 is to display red in a specific pixel, voltages are applied to the first electrode 3 and the second electrode 4 so that the first electrode 3 is positive while the second electrode 4 is negative in the first cell 5a, which contains the red-colored (R) first charged particles 6a. As a result, the first charged particles 6a are attracted to the first electrode 3 and located on the bottom of the first cell 5a (FIG. 2 (a)). Conversely, when voltages are applied to the first electrode 3 and the second electrode 4 so that the first electrode 3 is negative while the second electrode 4 is positive in the second and third cells 5a and 5b, the second and third charged particles 6b and 6c are attracted to the second electrode 4 and located on the inner side of the second and third cells 5a and 5b (FIG. 2 (b)). When the display unit 2 in this state is observed from above, only the color of the first charged particles 6a (red) is perceived. The colors of the second charged particles 6b (green) and third charged particles 6c (blue) cannot be perceived because these particles are hidden behind the second and third cells 5b and 5c, the second electrode 4, or the shielding means. Thus, the pixel displays red (FIG. 3 (a)).

Further, in order to display green in a specific pixel, the first electrode 3 is made positive while the second electrode 4 is made negative in the second cell 5b so that the second charged particles 6b are moved to the bottom of the second cell 5b (FIG. 2 (a)). In the first and third cells 5a and 5c, the first electrode 3 is made negative while the second electrode 4 is made positive so that the first and third charged particles 6a and 6c are moved to the inner side of the first and third cells 5a and 5c (FIG. 2 (b)). When the display unit 2 in this state is observed from above, only the color of the second charged particles 6b (green) is perceived. The colors of the first charged particles 6a (red) and third charged particles 6c (blue) cannot be perceived because these particles are hidden behind the first and third cells 5a and 5c, the second electrode 4, or the shielding means. Thus, the pixel displays green (FIG. 3 (b)).

Similarly, in order to display blue in a specific pixel, the first electrode 3 is made positive while the second electrode 4 is made negative in the third cell 5c so that the third charged particles 6c are moved to the bottom of the third cell 5c (FIG. 2 (a)). In the first and second cells 5a and 5b, the first electrode 3 is made negative while the second electrode 4 is made positive so that the first and second charged particles 6a and 6b are moved to the inner side of the first and second cells 5a and 5b (FIG. 2 (b)). When the display unit 2 in this state is observed from above, only the color of the third charged particles 6c (blue) is perceived. The colors of the first charged particles 6a (red) and second charged particles 6b (green) cannot be perceived because these particles are hidden behind the first and second cells 5a and 5b, the second electrode 4, or the shielding means. Thus, the pixel displays blue (FIG. 3 (c)).

In addition, in order to display white in a specific pixel, the values of the voltage to be applied to the first electrode 3 and the second electrode 4 are adjusted so that the first to third charged particles 6a to 6c are dispersed in the first to third cells 5a to 5c (FIG. 3 (d)). When the display unit 2 in this condition is observed from above, the colors of the first to third charged particles 6a to 6c are presented as an additive color mixture. Thus, the pixel color is white.

As described above, in the electrophoretic display device 1, the display units 2, each corresponding to a single pixel, comprise the first to third cells 5a to 5c, which are laminated. The first to third charged particles 6a to 6c are made to move inside the first to third cells 5a to 5c, thereby allowing a single pixel to display various colors. Accordingly, unused pixels, which do not contribute to image display, are not present in the image range. Consequently, a full-color image can be displayed without using a color filter.

Advantageous Effects of Invention

The electret fine particles of the present invention are useful as electrophoretic particles used for a full-color electrophoretic display device, because the core part contains a pigment dispersed therein. Further, the electret fine particles of the present invention are each uniformly electrified and exhibit excellent electrophoretic properties, because the shell part contains an electret resin.

DESCRIPTION OF EMBODIMENTS

The present invention is described below in more detail with reference to the Preparation Examples and Test Examples. The present invention is, however, not limited to these Preparation Examples and Test Examples.

Example 1

The following were used as starting materials for producing electret fine particles.
A. Zeffle GK-510 (a core-part material that can disperse a pigment therein)
B. Pigment
C. Zirconia beads Ø 0.3 (pigment ground media)
D. VT470 ethyl acetate solution (a shell-part material)
E. Desmodur L 75 (a curing agent for the core part)
F. PVA 224 5% aqueous solution (emulsifier)

Electret fine particles were prepared according to the following procedure.
(1) A and B were weighed, placed in a beaker, and stirred using a dissolver. Stirring conditions: 500 rpm×30 minutes
(2) C was weighed and added to (1). Stirring conditions: 2000 rpm×1 hour.
(3) (2) was filtered through a 250 mesh filter to remove beads to obtain a pigment dispersion.
(4) (3) and D were weighed and stirred in another beaker using a dissolver. Stirring conditions: 700 rpm×30 minutes.
(5) E was weighed and added to (4). Stirring conditions: 1000 rpm×1 hour
(6) F was weighed (200 g) and placed in a beaker, and stirred using a homomixer. Stirring conditions: 2000 rpm.
(7) (5) was added to (6) after initiation of stirring, and the mixture was stirred using a homomixer. Stirring conditions: 6000 rpm×6 minutes.
(8) (7) was stirred in a warm bath (50-80° C.) with a propeller. Stirring conditions: 600 rpm×4 hours.
(9) (8) was diluted with ion-exchange water, and solid-liquid separation was performed using a centrifuge. Centrifugation conditions: 2000 rpm×10 minutes. The precipitate was washed repeatedly, 4 times.
(10) The precipitate after washing was dried in an incubator at 50° C., and ground to obtain fine particles.
(11) The fine particles were spread in an aluminum cup, and electretized by means of electron ray irradiation. Electron ray irradiation conditions: acceleration voltage: 800 kV; radiation quantities: 100 kGy; and temperature: 120° C. (air atmosphere). Thereby, electret fine particles were obtained.

Example 2

Electret fine particles were prepared as in Example 1, except that components A and E were replaced with the following:
A. Methyl methacrylate monomer (a core-part material that can disperse a pigment therein); and
E. Azobisisobutyronitrile (a polymerization initiator for the core part)

Example 3

Electret fine particles were prepared as in Example 1, except that components A and E were replaced with the following:
A. jER 828 (a core-part material that can disperse a pigment therein); and
E. jER Cure ST11 (a curing agent for the core part)

Comparative Examples 1-3

Electret fine particles were prepared as in Examples 1, 2, or 3, except that component D, which is VT470 ethyl acetate solution (a shell-part material), was not used.

Test Example 1

Electrophoresis Test

Figure 1:
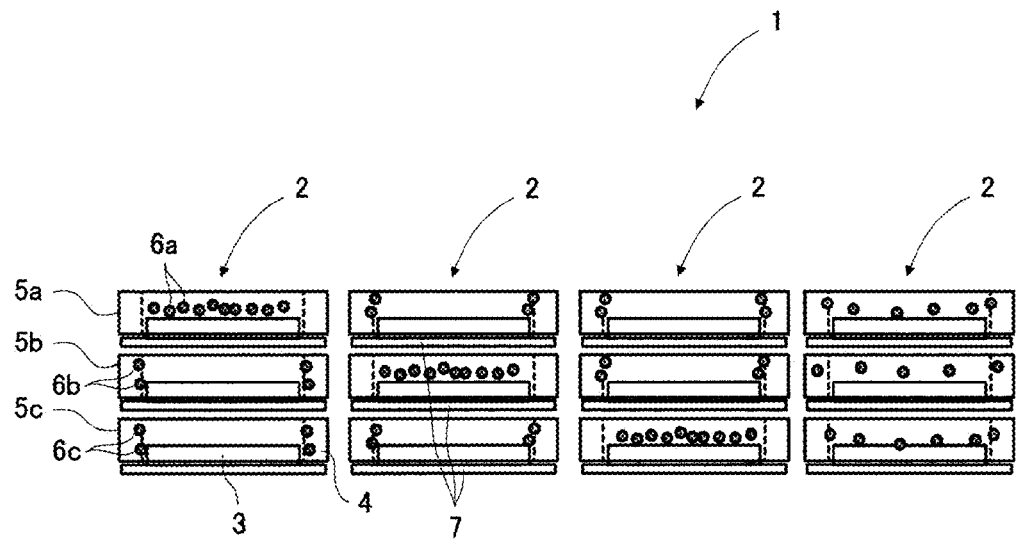
FIG. 1 is a front cross-sectional schematic view of an electrophoretic display device (an example).
Figure 2:
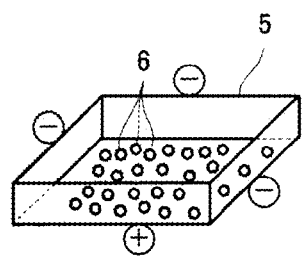
FIG. 2 is a perspective view showing movement of charged particles in an electrophoretic display device (an example).
Figure 2:
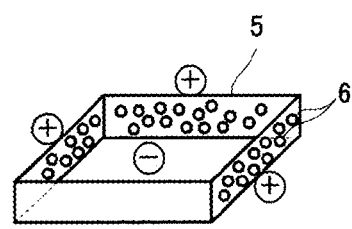
Figure 3:
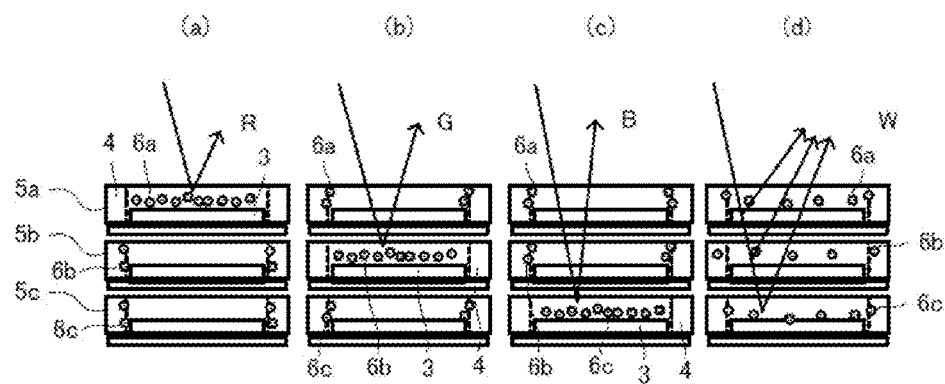
FIG. 3 is a front cross-sectional schematic view showing operation of an electrophoretic display device (an example).
Figure 4:
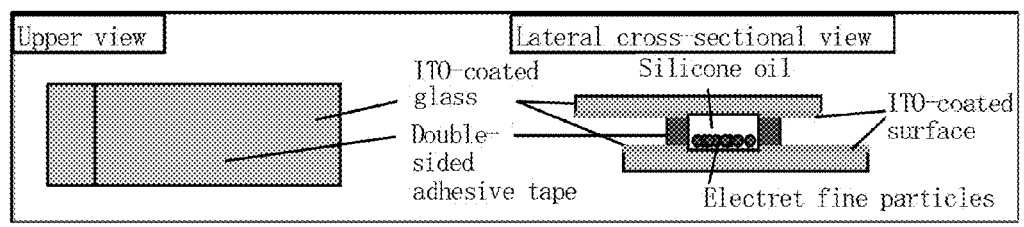
FIG. 4 shows an upper view and a lateral cross-sectional view of an electrophoretic display device used in the Examples and Comparative Examples.

An electrophoresis test was conducted for the electret fine particles obtained in Examples 1 to 3 and Comparative Examples 1 to 3 using the electrophoresis test device shown in FIG. 4. Specifically, the test was conducted as follows.

An ITO-coated glass sheet produced by Kuramoto Co., Ltd. (300 mm (height)×400 mm (width)×0.7 mm (thickness), 7 Ω/sq or less) was cut into a 30 mm×50 mm piece. Sumitomo 3M double-sided adhesive tape (Scotch super-strength adhesive tape, 19 mm (width)×4 m (length)×1 mm (thickness)) was cut into a 20-mm piece, and an 8-mm-diameter hole was made in the central portion.

The 20-mm adhesive tape was attached somewhat left of the center of the ITO-coated glass surface.

The hole in the double-sided adhesive tape was filled with electret fine particles in an amount without overflow.

The liner was peeled off from the other side of the double-sided adhesive tape, i.e., the side not attached to the glass surface, and a 30 mm×50 mm piece of ITO-coated glass was placed on that side of the adhesive tape. Here, to allow portions to be clipped with a crocodile clip, the positions of the two pieces of glass were staggered, as shown in the lateral view of FIG. 4. The two ITO-coated surfaces have an interval corresponding to the thickness of the double-sided adhesive tape (1 mm).

The double-sided adhesive tape between the two pieces of glass was pricked with a syringe (Nipro) containing silicone oil (Shin-Etsu Chemical Co., Ltd), and the hole in the adhesive tape was filled with silicone oil.

The edges of the two ITO-coated pieces of glass were connected with a crocodile clip, and a voltage was applied from an external power supply (HJPM-5R0.6 high-pressure power supply, Matsusada Precision Inc.), thereby examining the electrophoretic properties of the electret fine particles.

Table 1 describes each component used in Examples 1-3 and Comparative Examples 1-3 in detail, and shows the evaluation results of the electrophoretic properties of each of the electret fine particles.

TABLE 1

| Formulation | Example | | | Comparative Example | | |
|---|---|---|---|---|---|---|
| | 1 | 2 | 3 | 1 | 2 | 3 |
| Zeffle GK-510 (fluorocarbon resin) | 9.0 | | | 45.0 | | |
| Desmodur L75 (curing agent) | 2.0 | | | 12.0 | | |
| VT470 5% ethyl acetate solution | 60.0 | 30.0 | 30.0 | | | |
| Methyl methacrylate monomer | | 30.0 | | | 60.0 | |
| Azobisisobutyronitrile (polymerization initiator) | | 0.4 | | | 0.7 | |
| jER 828 (epoxy resin) | | | 20.0 | | | 40.0 |

TABLE 1-continued

| | | | | | | |
|---|---|---|---|---|---|---|
| jER Cure ST11 (curing agent) | | | 12.0 | | | 24.0 |
| Symuler Fast Yellow 4GO | 1.0 | | | 5.0 | | |
| Fastogen Super Magenta RG | | 6.0 | | | 12.0 | |
| Fastogen Blue TGR | | | 1.2 | | | 2.4 |
| | 72.0 | 66.4 | 63.2 | 62.0 | 72.7 | 66.4 |
| Effect | | | | | | |
| Electrophoresis | A | A | A | B | C | C |

| Product name | Manufacturer | Formulation |
|---|---|---|
| Zeffle GK-510 | Daikin Industries, Ltd. | Tetrafluoroethylene-vinyl monomer copolymer |
| VT470 | | Vinylidene fluoride-hexafluoropropylene-tetrafluoroethylene terpolymer |
| Desmodur L 75 | Sumika Bayer Urethane Co., Ltd. | Isocyanate curing agent |
| | Reagent | Methyl methacrylate Azobisisobutyronitrile |
| jER 828 (epoxy resin) | Mitsubishi Chemical Corporation | Epoxy resin |
| jER Cure ST11 (curing agent) | | Epoxy resin curing agent |
| Symuler Fast Yellow 4GO | DIC | Pigment |

TABLE 1-continued

| | |
|---|---|
| Fastogen Super Magenta RG | Pigment |
| Fastogen Blue TGR | Pigment |

Electrophoresis Evaluation
A: Uniform electrophoresis was observed.
B: Uneven electrophoresis was observed.
C: Electrophoresis was not observed.

Examples 4-8

The following were used as starting materials of electret fine particles. Table 2 shows the specific formulation.
A. VT470 (fluorocarbon resin: shell-part material)
B. Acrylic resin beads (three types shown in Table 2)
C. Urethane resin beads
D. Styrene resin beads
E. PVA224 (starting material of emulsifier)

Electret fine particles were prepared according to the following procedure.

A fluorocarbon resin (VT470) was dissolved in ethyl acetate to a concentration of 5%, and resin beads B, C, or D were mixed and stirred with the resulting solution.

PVA224 was dissolved in ion-exchange water to a concentration of 5% to obtain an emulsifier. A resin bead-mixed solution was weighed (200 g) and stirred at 2000 rpm using a homomixer. To this mixed solution under stirring was added the emulsifier (50 g) obtained above, and the solution was emulsified by stirring using a homomixer at 6000 rpm for 6 minutes. The emulsion was stirred in a warm bath at 50 to 80° C. with a propeller. Stirring conditions: 3 hours at 600 rpm.

The slurry after stirring above was diluted with ion-exchange water, and solid-liquid separation was performed using a centrifuge. The precipitate was washed repeatedly, 4 times. The precipitate after washing was dried in an incubator at 50° C., and ground to thereby obtain electret fine particles.

Comparative Examples 4-8

Electret fine particles were obtained as in Examples 4 to 8, except that the fluorocarbon resin was not used.

TABLE 2

| | | Example | | | | | Comparative Example | | | | |
|---|---|---|---|---|---|---|---|---|---|---|---|
| | | 4 | 5 | 6 | 7 | 8 | 4 | 5 | 6 | 7 | 8 |
| Fluorocarbon resin | *1 | 25.00 | 25.00 | 25.00 | 25.00 | 25.00 | | | | | |
| Acrylic resin bead | *2 | 75.00 | | | | | 100.00 | | | | |
| | *3 | | 75.00 | | | | | 100.00 | | | |
| | *4 | | | 75.00 | | | | | 100.00 | | |
| Urethane resin bead | *5 | | | | 75.00 | | | | | 100.00 | |
| Styrene resin bead | *6 | | | | | 75.00 | | | | | 100.00 |
| Total | | 100.00 | 100.00 | 100.00 | 100.00 | 100.00 | 100.00 | 100.00 | 100.00 | 100.00 | 100.00 |
| Electrophoresis Evaluation | | A | A | A | B to A | B to A | C | C | C | C | C |

*1 VT470
*2 Rubcouleur 215SSM (White)
*3 Rubcouleur 224SMD (Black)
*4 TAFTIC AR650S (Red)
*5 Art Pearl C400WA (White)
*6 Techpolymer SBX-6 (Color free)

Test Example 2

Electrophoresis Test

Table 2 also shows the evaluation results of the electrophoretic properties of electret fine particles of Examples 4-8 and Comparative Examples 4-8. The electrophoresis test and the evaluation method were conducted as in Test Example 1.

EXPLANATION OF REFERENCE NUMERALS

1. Electrophoretic Display Device
2. Display Unit
3. First Electrode
4. Second Electrode
5a-5c. First to third cells
6a-6c. First to third charged particles

The invention claimed is:

1. A core-shell electret fine particle comprising a core part and a shell part,
   the core part containing a material that has an ability to disperse a pigment therein,
   the shell part consisting essentially of an electret resin,
   the electret resin being a fluorine-containing resin selected from the group consisting of polytetrafluoroethylene, polychlorotrifluoroethylene, polyvinylidene fluoride, polyvinyl fluoride, perfluoropolyether, tetrafluoroethylene-perfluoroalkoxyvinylether copolymer, tetrafluoroethylene-hexafluoropropylene copolymer, tetrafluoroethylene-ethylene copolymer, chlorotrifluoroethylene-ethylene copolymer, vinylidene fluoride-tetrafluoroethylene copolymer, vinylidenefluoride-hexafluoropropylene-tetrafluoroethylene terpolymer, and a combination thereof, and
   the electret resin being electretized by electron ray irradiation, radial ray irradiation, or corona discharge treatment.

2. The electret fine particle according to claim 1, wherein the electret resin is a fluorine-containing resin having a percent fluorine substitution of 10% or more.

3. The electret fine particle according to claim 1, wherein the electret resin is a vinylidenefluoride-hexafluoropropylene-tetrafluoroethylene terpolymer.

4. The electret fine particle according to claim 1, wherein the material that has an ability to disperse a pigment therein is a resin.

5. The electret fine particle according to claim 1, wherein the electret fine particle has a mean particle diameter of 1000 μm or less.

6. The core-shell electret fine particle comprising a core part and a shell part according to claim 1,
   wherein the core part contains a resin that has an ability to disperse a pigment therein and a pigment having a mean particle diameter of 0.02 to 0.2 μm, and the shell part contains an electret resin, the electret resin being a vinylidenefluoride-hexafluoropropylene-tetrafluoroethylene terpolymer and being electretized by electron ray irradiation, radial ray irradiation, or corona discharge treatment, and
   wherein the electret fine particle has a mean particle diameter of 1000 μm or less.

7. A process for producing a plurality of the core-shell electret fine particles according to claim 1, comprising:
   forming a plurality of core-shell structures each comprising a core part containing a material that has an ability to disperse a pigment therein, and a shell part containing a fluorine-containing resin as a resin for electretization; and
   subjecting the plurality of core-shell structures to electron ray irradiation, radial ray irradiation, or corona discharge treatment,
   so as to obtain the plurality of the core-shell electret fine particles according to claim 1.

8. The production process according to claim 7, wherein the core-shell structures are dispersed in an electrophoretic medium to be subjected to electron ray irradiation, radial ray irradiation, or corona discharge treatment.

9. The electret fine particle according to claim 2, wherein the electret resin is a vinylidenefluoride-hexafluoropropylene-tetrafluoroethylene terpolymer.

10. The electret fine particle according to claim 2, wherein the material that has an ability to disperse a pigment therein is a resin.

11. The electret fine particle according to claim 3, wherein the material that has an ability to disperse a pigment therein is a resin.

12. The electret fine particle according to claim 2, wherein the electret fine particle has a mean particle diameter of 1000 μm or less.

13. The electret fine particle according to claim 3, wherein the electret fine particle has a mean particle diameter of 1000 μm or less.

14. The electret fine particle according to claim 4, wherein the electret fine particle has a mean particle diameter of 1000 μm or less.

15. The electret fine particle according to claim 1, wherein the core part comprises a fluorine-containing material, the fluorine-containing material being one of a fluorine-containing resin selected from the group consisting of tetrafluoroethylene resin, straight-chain fluoropolyether compound, tetrafluoroethylene-vinyl monomer copolymer, and polymerizable amorphous fluorocarbon resin; a fluorine-containing oil; and a fluorine-containing adhesive.

16. The electret fine particle according to claim 1, wherein the core part consists essentially of a fluorine-containing material and a pigment having a mean particle diameter of 0.02 to 0.2 μm.

* * * * *